(12) United States Patent
Biancamano et al.

(10) Patent No.: US 9,124,350 B2
(45) Date of Patent: Sep. 1, 2015

(54) CASE FOR MOBILE DEVICE

(71) Applicants: Francesco Biancamano, Flushing, NY (US); Christopher Misir, Florida, NY (US)

(72) Inventors: Francesco Biancamano, Flushing, NY (US); Christopher Misir, Florida, NY (US)

( * ) Notice: Subject to any disclaimer, the term of this patent is extended or adjusted under 35 U.S.C. 154(b) by 61 days.

(21) Appl. No.: 13/969,087

(22) Filed: Aug. 16, 2013

(65) Prior Publication Data

US 2014/0378193 A1    Dec. 25, 2014

Related U.S. Application Data

(60) Provisional application No. 61/837,967, filed on Jun. 21, 2013.

(51) Int. Cl.
*H04B 1/3888* (2015.01)

(52) U.S. Cl.
CPC .................................. *H04B 1/3888* (2013.01)

(58) Field of Classification Search
CPC ... H04M 1/0202; H04M 1/0214; H04M 1/21; H04M 1/0206; H04M 1/23; H04B 1/3888

USPC .............................. 455/575.1, 575.8; 361/679
See application file for complete search history.

(56) References Cited

U.S. PATENT DOCUMENTS

| | | | | |
|---|---|---|---|---|
| 7,820,259 | B2* | 10/2010 | Wu | 428/412 |
| 8,794,536 | B2* | 8/2014 | Johnson | 235/492 |
| 2004/0075032 | A1* | 4/2004 | Lutz | 248/206.3 |
| 2011/0077061 | A1* | 3/2011 | Danze et al. | 455/575.1 |
| 2011/0229671 | A1* | 9/2011 | Chen et al. | 428/36.8 |
| 2012/0329534 | A1* | 12/2012 | Barnett et al. | 455/575.8 |
| 2015/0065210 | A1* | 3/2015 | Drori et al. | 455/575.8 |

* cited by examiner

*Primary Examiner* — Kashif Siddiqui
*Assistant Examiner* — Obidon Bassinan
(74) *Attorney, Agent, or Firm* — The Farrell Law Firm, P.C.

(57) ABSTRACT

A case is provided for a mobile device. The case includes a first component having a back wall and a plurality of side walls for encasing the mobile device, and having at least one aperture in the back wall. The case also includes a second component disposed within the back wall and the plurality of side walls of the first component, and having at least one adhesive device that extends from a back surface of the second component and through the at least one aperture in the back wall of the first component.

7 Claims, 6 Drawing Sheets

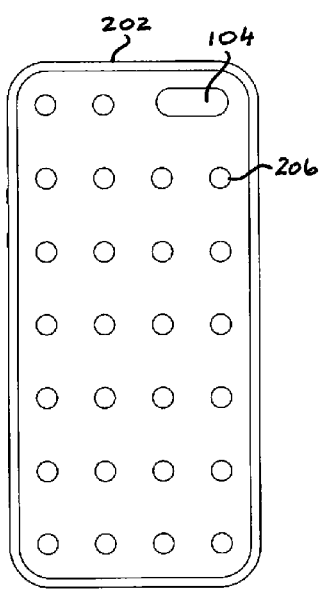 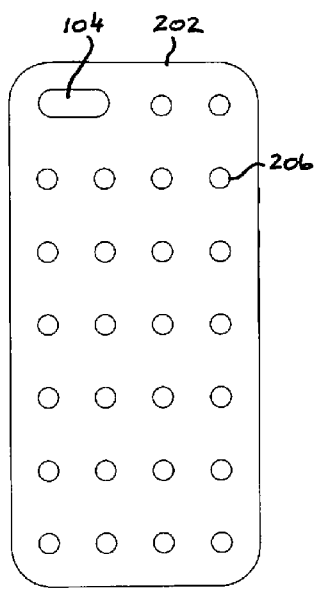 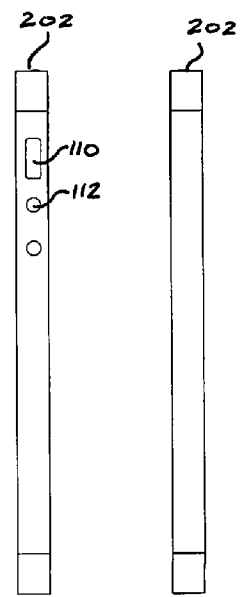 
FIG. 11    FIG. 12    FIG. 13    FIG. 14
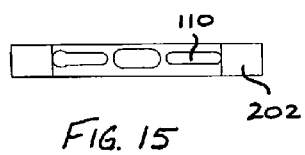 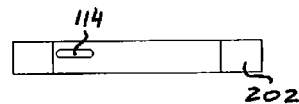
FIG. 15    FIG. 16

CASE FOR MOBILE DEVICE

PRIORITY

This application claims priority under 35 U.S.C. §119(e) to a U.S. provisional application filed on Jun. 21, 2013, and assigned Ser. No. 61/837,967, the contents of which are incorporated herein by reference.

BACKGROUND OF THE INVENTION

1. Field of the Invention

The present invention relates generally to a case for a mobile device, and more particularly, to a case for a mobile device with means for removable attachment or adhesion to a surface.

2. Description of the Related Art

Mobile devices are generally used to conveniently access data, view multimedia files, make phone calls, and access wireless networks. A mobile device may be embodied as, for example, a laptop, a portable media player, and a cellular phone. However, the more portable the mobile device is, the more susceptible the mobile device is to damage. Additionally, the more portable the mobile device is, the more likely it is for the mobile device to be used in areas where the mobile device is difficult to position or hold.

Mobile devices also include multiple applications that perform different functions. Placement of the mobile device can become important when using certain applications of the mobile device. For example, a Global Positioning System (GPS) application is most useful while a user is driving. However, placement of the mobile device within a visual area of the user may prove difficult in a vehicle. The same problem exists in the use of a telephone or music application in a vehicle. In another example, a user of the mobile device may want to capture an image using a photographing application without actually holding the device. This may result in a user propping or leaning the mobile device against another object.

SUMMARY OF THE INVENTION

The present invention has been made to address at least the above problems and/or disadvantages and to provide at least the advantages described below. Accordingly, an aspect of the present invention provides a case for a mobile device with means for removable attachment or adhesion to a surface.

According to one aspect of the present invention, a case is provided for a mobile device. The case includes a first component having a back wall and a plurality of side walls for encasing the mobile device, and having at least one aperture in the back wall. The case also includes a second component disposed within the back wall and the plurality of side walls of the first component, and having at least one adhesive device that extends from a back surface of the second component and through the at least one aperture in the back wall of the first component.

BRIEF DESCRIPTION OF THE DRAWINGS

Aspects, features and advantages of the present invention will become more apparent from the following detailed description when taken in conjunction with the accompanying drawings in which:

FIG. 11 is a diagram illustrating a front view of the first component of the case for a mobile device, according to an embodiment of the present invention;

FIG. 12 is a diagram illustrating a back view of the first component of the case for a mobile device, according to an embodiment of the present invention;

FIG. 13 is a diagram illustrating a side view of the first component of the case for a mobile device, according to an embodiment of the present invention;

FIG. 14 is a diagram illustrating an opposing side view of the first component of the case for a mobile device, according to an embodiment of the present invention;

FIG. 15 is a diagram illustrating a bottom view of the first component of the case for a mobile device, according to an embodiment of the present invention;

FIG. 16 is a diagram illustrating a top view of the first component of the case for a mobile device, according to an embodiment of the present invention;

DETAILED DESCRIPTION OF EMBODIMENTS OF THE PRESENT INVENTION

Embodiments of the present invention are described in detail with reference to the accompanying drawings. Detailed descriptions of constructions or processes known in the art may be omitted to avoid obscuring the subject matter of the present invention.

Figure 1:
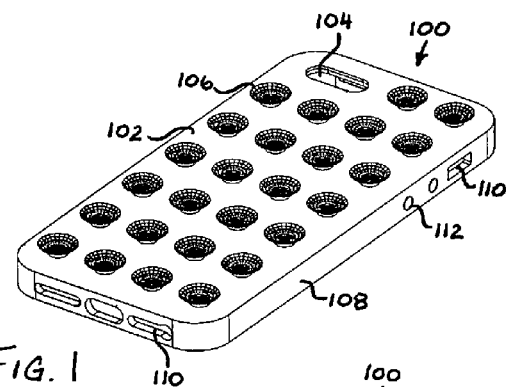
FIG. 1 is a diagram illustrating a back perspective view of a case for a mobile device, according to an embodiment of the present invention.

Referring initially to FIG. 1, a diagram illustrates a back perspective view of a case for a mobile device, according to an embodiment of the present invention. A case 100 is used to protect the mobile device from damage and to allow the mobile device to be easily attached or adhered to, and removed from, different surfaces. In the embodiment of the present invention illustrated in FIG. 1, the case 100 has a generally rectangular shape that includes four rounded corners. However, the shape of the case is not limited to this embodiment of the present invention, and may take the shape of any mobile device for which it is designed.

The case 100 has a back surface 102 that includes an aperture 104. The aperture 104 is disposed in a position on the back surface 102 that coincides with a position of a camera lens on a back surface of the mobile device. Thus, when mobile device is disposed within the case 100, the camera lens is able to function without interference from the case 100. In the embodiment of the present invention illustrated in FIG. 1, the aperture 104 is disposed in an upper-left corner of the back surface 102 of the case 100. However, the aperture may be disposed anywhere on the back surface 102 of the case 100 based on the mobile device for which the case 100 is designed. Additionally, there may be a plurality of apertures in the back surface 102, if other devices of the mobile device require access without interference from the back surface 102 of the case 100. Further, the back surface 102 of the case 100 may not include any apertures if a camera lens is not disposed on the back surface of the mobile device for which the case is designed.

Adhesive devices 106 extend from the back surface 102. In the embodiment of the present invention illustrated in FIG. 1, the adhesive devices 106 are illustrated as suction cups. However, any adhesive device having adhesive characteristics similar to that of the suction cups may be utilized in accordance with the present invention.

The suction cups 106 are of a smaller size allowing a large number of the suction cups 106 to be dispersed on the back surface 102. In the embodiment of the present invention illustrated in FIG. 1, 26 suction cups 106 are spaced equally in a grid-like pattern in the available space on the back surface 102.

The number and size of suction cups 106 may vary in different embodiments of the present invention. For example, embodiments of the present invention may have a number of suction cups that range from one to a maximum number of suction cups that are able to fit on the back surface 102. Further embodiments of the present invention may include a small number of larger suction cups or a large number of smaller suction cups. A larger number of suction cups increases attachment or adhesion strength of the case when applied to a surface, as compared to a smaller number of suction cups of the same size. Additionally, a larger number of small suction cups results in a greater possibility of having enough suctions cups adhere for secure attachment or adhesion of the case to the surface, when not all suction cups are able to adhere to the surface. Thus, it is not required for the surface to be completely flat for adhesion when a large number of suction cups are used. Additionally, the case can be attached or adhered to a surface that is smaller than the back surface 102, but larger than at least one suction cup.

The grid-like pattern of the suction cups 106 is used to occupy a large amount of the available space on the back surface 102. The more space occupied by the suction cups on the back surface 102, the greater chance of adhesion to a surface. In another embodiment of the present invention, the suction cups 106 are arranged in a staggered pattern. However, the suction cups 106 may be arranged in any pattern for reasons such as, for example, attachment/release properties and/or design.

In the embodiment of the present invention illustrated in FIG. 1, side surfaces 108 of the case 100 include additional apertures 110 and buttons 112. The additional apertures 110 are disposed in positions on the side surfaces 108 that coincide with positions of input terminals on side surfaces of the mobile device. For example, the additional apertures 110 may coincide with the mobile device's speaker, microphone, and/or headphone jack. When the mobile device is disposed within the case 100, the input terminals are still accessible through the additional apertures 110.

The buttons 112 are disposed in positions on the side surfaces 108 that coincide with positions of buttons on a side surface of the mobile device. For example the buttons 112 may coincide with volume control buttons of the mobile device. Accordingly, when the mobile device is disposed within the case 100, pressing buttons 112 results in the buttons of the mobile device being pressed.

The additional apertures and buttons may be disposed anywhere on the side surfaces 108 of the case 100 based on the mobile device for which the case 100 is designed. Additionally, the number and existence of additional apertures and buttons is dependent upon the mobile device for which the case 100 is designed.

Figure 2:
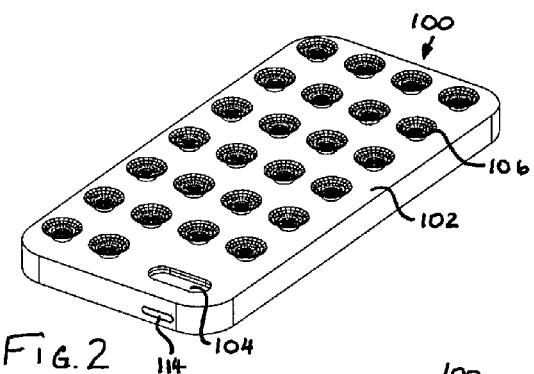
FIG. 2 is a diagram illustrating an opposing back perspective view of the case for a mobile device, according to an embodiment of the present invention.

FIG. 2 is a diagram illustrating an opposing back perspective view of the case for a mobile device, according to an embodiment of the present invention. As shown in FIG. 2, the side surfaces 108 of the case include an additional button 114. For example, the additional button 114 may coincide with a button for power control on the mobile device. As described above, the number and existence of additional apertures and buttons is dependent upon the mobile device for which the case 100 is designed.

Figure 3:
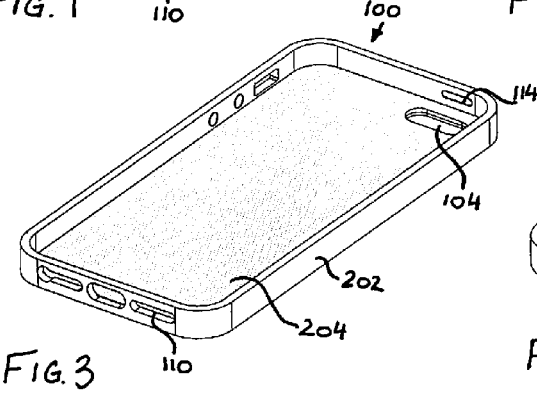
FIG. 3 is a diagram illustrating a front perspective view of the case for a mobile device, according to an embodiment of the present invention.
Figure 4:
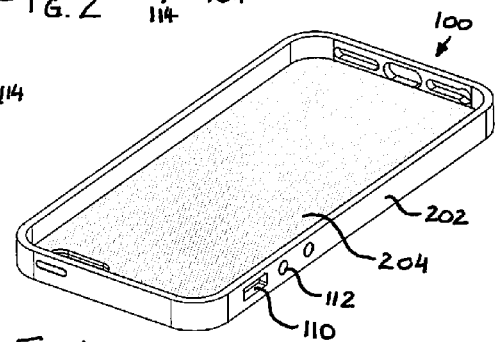
FIG. 4 is a diagram illustrating an opposing front perspective view of the case for a mobile device, according to an embodiment of the present invention.

FIGS. 3 and 4 are diagrams illustrating opposing front perspective views of the case for a mobile device, according to an embodiment of the present invention. The case 100 includes a first component 202 and a second component 204. The first component 202 of the case includes the back surface 102 and side surfaces 108 that are used to encase the mobile device. The first component may be constructed of a plastic, polymer, or metal material. The material used to construct the first component is able to protect the mobile device, when the mobile device is disposed within the case 100. For example, the first component 202 has the strength to sustain a fall without breaking, while also having the elasticity to protect the mobile device within the case 100.

The second component 204 is disposed within the first component 202. The second component 204 has a generally rectangular shape with rounded corners, and is shaped to fit within the side surfaces 108 of the first component 202. The second component 204 has a front side with a flat surface. The flat surface is disposed adjacent to a back surface of the mobile device, when the mobile device is disposed within the case 100. Thus, when the mobile device is disposed within the case 100, the second component 204 is locked within the case 100 between the mobile device and the first component 202.

A back side of the second component 204 includes the suction cups 106. Specifically, the second component 204 includes the suction cups 106 that extend out from the back surface 102 of the first component 202. The second component 204, including the suction cups 106, is flexible, and may be constructed of a latex material.

Additionally, according to an embodiment of the present invention, both the first component 202 and the second component 204 include the aperture 104 so that the case does not interfere with a camera lens of the mobile device. In alternative embodiments of the present invention, the apertures in the first component 202 and the second component may be different shapes. Further, the second component 204 may have a corner removed where the aperture 104 is disposed in the first component 202. As described above, the number, placement, and existence of this aperture is dependent up on the mobile device for which the case 100 is constructed.

Figures 5, 6:
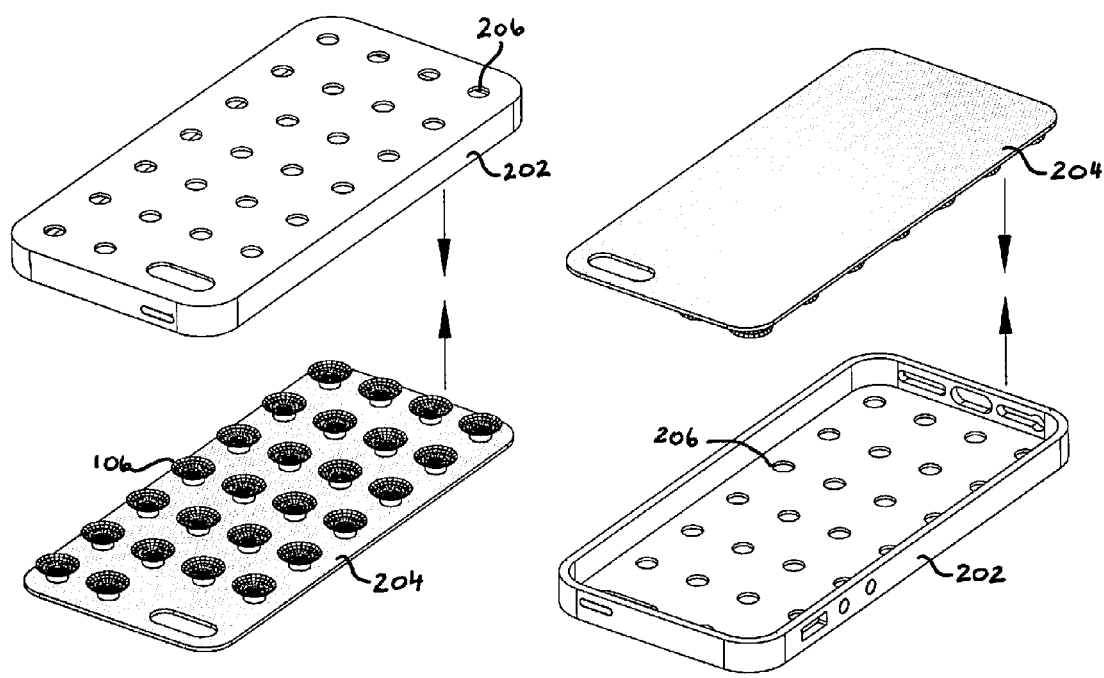
FIG. 5 is a diagram illustrating an exploded back perspective view of the components of the case for a mobile device, according to an embodiment of the present invention.
FIG. 6 is a diagram illustrating an exploded front perspective view of the components of the case for a mobile device, according to an embodiment of the present invention.
Figure 7:
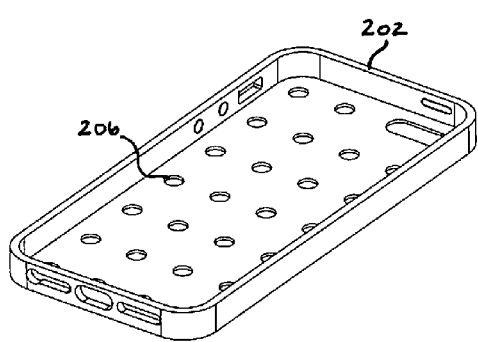
FIG. 7 is a diagram illustrating a front perspective view of a first component of the case for a mobile device, according to an embodiment of the present invention.
Figure 8:
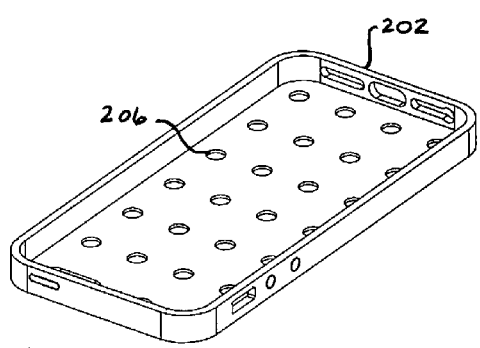
FIG. 8 is a diagram illustrating an opposing front perspective view of the first component of the case for a mobile device, according to an embodiment of the present invention.
Figure 9:
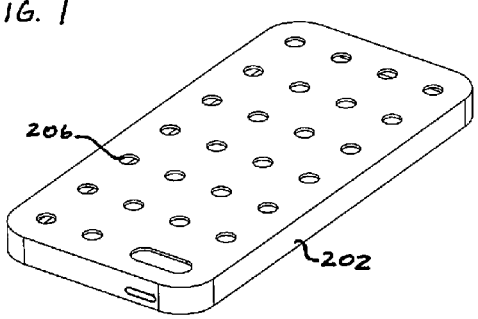
FIG. 9 is a diagram illustrating a back perspective view of the first component of the case for a mobile device, according to an embodiment of the present invention.
Figure 10:
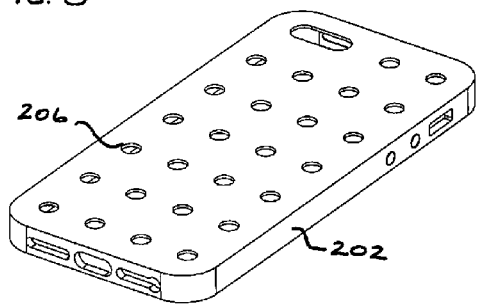
FIG. 10 is a diagram illustrating an opposing back perspective view of the first component of the case for a mobile device, according to an embodiment of the present invention.
Figure 17:
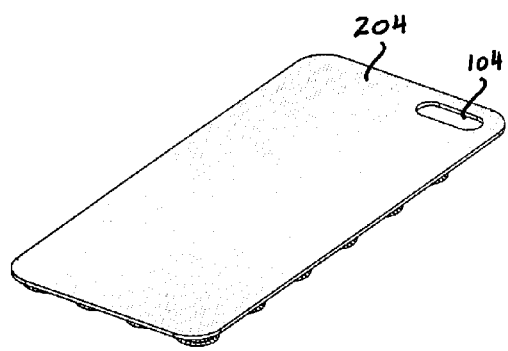
FIG. 17 is a diagram illustrating a front perspective view of a second component of the case for a mobile device, according to an embodiment of the present invention.
Figure 18:
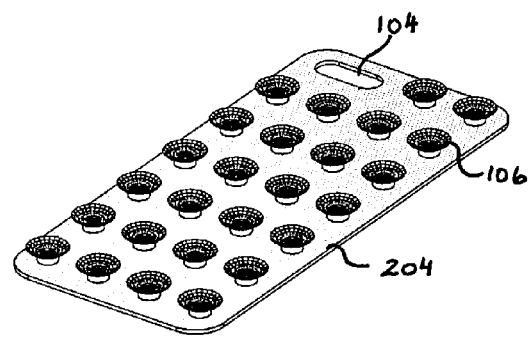
FIG. 18 is a diagram illustrating a back perspective view of the second component of the case for a mobile device, according to an embodiment of the present invention.
Figure 19:
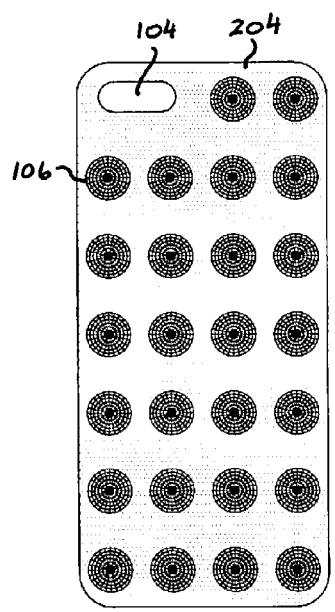
FIG. 19 is a diagram illustrating a back view of the second component of the case for a mobile device, according to an embodiment of the present invention.
Figure 20:
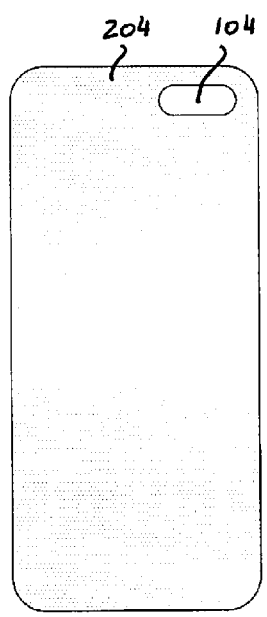
FIG. 20 is a diagram illustrating a front view of the second component of the case for a mobile device, according to an embodiment of the present invention.
Figure 21:
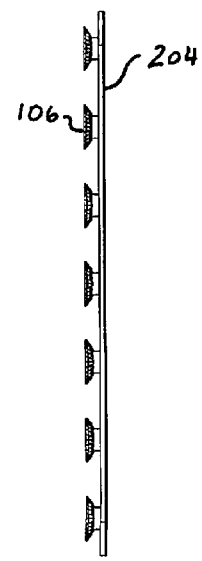
FIG. 21 is a diagram illustrating a side view of the second component of the case for a mobile device, according to an embodiment of the present invention.
Figure 22:
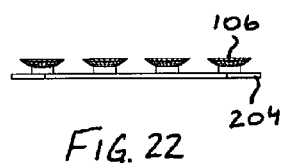
FIG. 22 is a diagram illustrating a bottom view of the second component of the case for a mobile device, according to an embodiment of the present invention.

FIGS. 5 and 6 are exploded opposing perspective views of the case for a mobile device, according to an embodiment of the present invention. The first component 202 includes a plurality of apertures 206 in a grid-like pattern. When the second component 204 is placed within the first component 202, the suction cups 106 are manipulated to extend through the plurality of apertures 206. Accordingly, each of the plurality of apertures 206 has a corresponding suction cup 106 extending there through when the case 100 is assembled. In an embodiment of the present invention, each of the plurality of apertures 206 has a diameter that is similar to that of a largest diameter of each of the suction cups 106. In another embodiment of the present invention, each of the plurality of apertures 206 has a diameter that is smaller than a largest diameter of each of the suction cups 106, but larger than a smallest diameter of each of the suction cups 106. As described above with respect to the suction cups 106, the number and pattern of the suction cups 106 and the corresponding apertures 206 may vary in different embodiments of the present invention.

FIGS. 7-16 are diagrams illustrating varying views of the first component of the case for a mobile device, according to an embodiment of the present invention. Specifically, FIGS. 7-16 illustrate front perspective, back perspective, front, back, side, top, and bottom view of the first component 202. The second component 204 may be removed from the first component 202, and the first component 202 may function alone as the case 100 for the mobile device when it is not desirable to have the suction cups 106 for affixing the case to a surface. According to an embodiment of the present invention, the case 100 may function as a protective case without suction cups, or as a protective case that uses suction cups to removably attach or adhere the case to a surface.

FIG. 17-22 are diagrams illustrating varying views of the second component of the case for a mobile device, according to an embodiment of the present invention. Specifically, FIGS. 17-22 illustrate front perspective, back perspective, front, back, side, and bottom views of the second component 204.

While the invention has been shown and described with reference to a certain preferred embodiment thereof, it will be understood by those skilled in the art that various changes in form and details may be made therein without departing from the spirit and scope of the invention.

What is claimed is:

1. A case for a mobile device comprising:
    a first component comprising a back wall and a plurality of side walls for encasing the mobile device, and comprising at least one aperture in the back wall; and
    a second component disposed within the back wall and the plurality of side walls of the first component and comprising at least one adhesive device that extends from a back surface of the second component and through the at least one aperture in the back wall of the first component, wherein the second component is removable from the first component, and the case can be used by the mobile device without the second component and the at least one adhesive device.

2. The case of claim 1, wherein the second component comprises a flat front surface.

3. The case of claim 2, wherein the second component is locked in position between the back wall of the first component and a back surface of the mobile device, when the mobile device is disposed within the case.

4. The case of claim 1, wherein the second component has a shape corresponding to the side walls of the first component.

5. The case of claim 1, wherein the plurality of apertures and the plurality of adhesive devices arc disposed in a grid-like pattern or a staggered pattern.

6. The case of claim 1, wherein the first component comprises at least one of an additional aperture and a button used to access a function of the mobile device when the mobile device is within the case.

7. The case of claim 1, wherein the plurality of adhesive devices comprises a plurality of suction cups.

\* \* \* \* \*